United States Patent [19]

Gilding et al.

[11] 4,062,834

[45] Dec. 13, 1977

[54] METHOD FOR PREPARING EXTRUDABLE POLYTETRAMETHYLENE ETHER POLYURETHANE-UREA RESINS

[75] Inventors: Denis Keith Gilding, Liverpool, England; John Albert Taylor, Jr., Furlong, Pa.

[73] Assignee: Ethicon, Inc., Somerville, N.J.

[21] Appl. No.: 572,773

[22] Filed: Apr. 29, 1975

Related U.S. Application Data

[63] Continuation-in-part of Ser. No. 361,012, May 16, 1973.

[51] Int. Cl.² ............................................. C08G 18/32
[52] U.S. Cl. ................... 260/77.5 AA; 260/77.5 AM; 260/77.5 AT
[58] Field of Search ............. 260/77.5 AA, 77.5 AM, 260/77.5 AT

[56] References Cited

U.S. PATENT DOCUMENTS

| | | | |
|---|---|---|---|
| 2,830,037 | 4/1958 | Carter | 260/77.5 AM |
| 2,901,467 | 8/1959 | Croco | 260/77.5 AM |
| 2,929,800 | 3/1960 | Hill | 260/77.5 AM |
| 2,929,804 | 3/1960 | Steuber | 260/30.6 R |
| 3,077,006 | 2/1963 | Ibrahim | 260/77.5 AA |
| 3,428,711 | 2/1969 | Hunt | 260/859 R |
| 3,635,907 | 1/1972 | Schulze et al. | 260/77.5 AA |
| 3,752,786 | 8/1973 | Rossitto et al. | 260/77.5 AA |

*Primary Examiner*—M. J. Welsh
*Attorney, Agent, or Firm*—Wayne R. Eberhardt

[57] ABSTRACT

Melt extrudable thermoplastic polytetramethylene ether polyurethane-urea elastomers of this invention are prepared by reacting a tetramethylene ether glycol with 4,4'-diphenyl methane diisocyanate to form a polytetramethylene ether polyurethane pre-polymer having a number average molecular weight of from about 2,000 to about 10,000. This pre-polymer is water extended to form a thermoplastic bio-compatible elastomer having a number average molecular weight of about 50,000 to about 100,000, and a weight average molecular weight of about 300,000 to about 1,000,000. The elastomer so obtained has a softening point in the range of 127° – 149° C. and may be melt extruded without decomposition to produce articles useful in the field of medicine and surgery.

11 Claims, No Drawings

METHOD FOR PREPARING EXTRUDABLE POLYTETRAMETHYLENE ETHER POLYURETHANE-UREA RESINS

This application is a continuation-in-part of copending application Ser. No. 361,012 filed May 16, 1973.

The present invention relates to polyurethane resins, and more specifically, to a method of preparing polytetramethylene ether polyurethane-urea resins wherein the urea groups are separated by units having a number average molecular weight of from about 2,000 to about 10,000. The polymer compositions prepared in accordance with the present invention are thermoplastic bio-compatible elastomers having application in the field of medicine and surgery.

The bio-medical applications of segmented polyurethane and the use of this material in the construction of prosthetic devices has been investigated at the National Institutes of Health. J. W. Boretos, W. S. Pierce, and others have published on the work of this group. The material advantages of a segmented polyurethane elastomer in the manufacture of thin-walled non-kinking catheters have been described by Kolobow and Zapol in *Surgery*, Vol. 68, pp. 625–629 (1970).

Since the first Boretos paper dealing with segmented polyurethane was published in 1967, additional publications have substantiated the view that segmented polyurethane is the composition of choice for such applications as implantable left ventricular assist pumps, non-kinking thin-walled catheters and cannuli, T-tubes, thin-walled endotracheal tubes, roller pump chambers for extracorporeal blood pumping, blood bags, etc. The advantages claimed for segmented polyurethane are bio-compatibility, long flex life, and superior tensile strength.

Segmented polyurethane compositions and methods for preparing the same have been described in U.S. patents issued to Hill (U.S. Pat. No. 2,929,800), Steuber (U.S. Pat. No. 2,929,804), Arvidson and Blake (U.S. Pat. No. 2,999,839), Hunt (U.S. Pat. No. 3,428,711), and Carter (U.S. Pat. No. 2,830,037). However, those segmented polyurethane compositions having the tensile strength and superior flex life required of medical products also have a high softening point and decompose at temperatures close to the melting point of the polymer. For this reason, it is impractical to manufacture tubing and other shapes having medical application by thermoforming such segmented polyurethane compositions. As a consequence, segmented polyurethane tubing for medical use is still manufactured by applying a solution of the elastomeric composition in a solvent on to a rotating mandrel. After evaporation of the solvent, the segmented polyurethane tubing is stripped from the mandrel.

It is an object of the present invention to provide a segmented polyurethane composition that is bio-compatible, has the physical properties required for medical use, and may be readily extruded at a low temperature without decomposition.

It has now been found that new and valuable polytetramethylene ether polyurethane-urea resins having the characteristics described in the object set forth above are obtained by reacting a polytetramethylene ether glycol having a molecular weight of at least 650 and no more than 2,000 with 4,4′-diphenyl methane diisocyanate to form a pre-polymer having a number average molecular weight of from about 2,000 to about 10,000. This pre-polymer is extended with water to form a polytetramethylene ether polyurethane-urea elastomer having a number average molecular weight in the range of 50,000 to 100,000. The elastomer so obtained has a softening point in the range of 127° – 149° C and may be melt extruded without decomposition to produce articles useful in the field of surgery and medicine.

While applicants do not wish to be limited by any specific theory, it is believed that the thermoformability of the polytetramethylene ether polyurethane-urea compositions to be described is related to the distance between the urea groups in the polymer chain. Separation of these urea groups by units having a number average molecular weight of about 2,000 to about 10,000 reduce the extent of hydrogen bonding between urea groups thus lowering the melting point of the polymers sufficiently to allow melt processing without thermal degradation.

As will be described more fully below, the polytetramethylene ether polyurethane-urea resins of the present invention have the bio-compatibility that has been noted above, but have an important advantage over the segmented polyurethane investigated by the National Institute of Health in that the distance between urea groups in the polymer chain is such that the softening point of the polymer is below 150° C. This low melting point permits thermoforming of the resin and thereby eliminates the high cost of forming shaped articles by depositing segmented polyurethane from solution and volatilizing the solvent to form successive layers.

In preparing the pre-polymer, the ratio of 4,4′-diphenyl methane diisocyanate to tetramethylene oxide glycol is between 1.3:1 and 1.7:1. Pre-polymer prepared from mixtures in which the ratio of 4,4′-diphenyl methane diisocyanate to tetramethylene ether glycol is greater than 1.7:1 are of too low molecular weight and pre-polymers prepared from mixtures in which the ratio of 4,4′-diphenyl methane diisocyanate to tetramethylene ether glycol is less than 1.3:1 are difficult to reproduce in that the molecular weight of consecutive polymer batches may vary. The polymerization reaction is exothermic and is carried out at about 85° C. for about 1½ hours.

When the tetramethylene ether glycol and 4,4′-diphenyl methane diisocyanate react with one another, an initial reaction takes place with the formation of a linear pre-polymer containing urethane linkages. This reaction may be represented as follows:

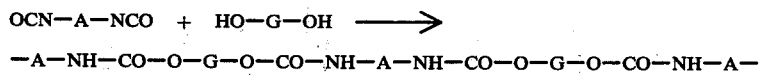

where A is a bivalent organic radical having the structure:

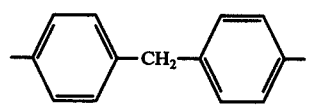

and G is a bivalent organic radical having the structure:

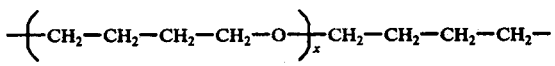

and $x$ is an integer such that the molecular weight of the radical G is between about 650 and 2,000.

Since the 4,4'-diphenyl methane diisocyanate is present in molar excess, this pre-polymer will have terminal isocyanate groups and may be represented by the formula:

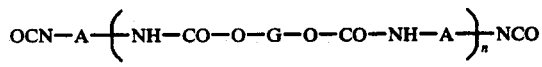

in which A and G have the significance stated above and $n$ is an integer greater than 0. These intermediate pre-polymers are then dissolved in a solvent such as a dimethyl acetamide and reacted with water to extend the chain. The reaction of isocyanates with water is described in the literature to proceed as follows:

It has been found advantageous in extending the pre-polymer chain with water to have present in the reaction mixture an effective amount, e.g., from about 0.01 to 0.07 mols per mol of water of a secondary amine such as dibutyl amine to act as a chain terminating agent and control the molecular weight of the polymer. The molar ratio of water in the chain extender solution to tetramethylene ether glycol in the initial reaction is advantageously from about 0.5:1 to 1.5:1. This chain termination reaction may be represented as follows:

It will be understood that the free isocyanate groups present in the growing polymer chain may react with any active hydrogen atoms present in the reaction mixture and that any low molecular weight mono-functional organic amine, mercaptan, or alcohol which will react with such isocyanate groups to terminate the chain may be substituted for the dibutyl amine.

The chain-extended polymer is precipitated from solution by the addition of a mixture of water and methanol. The resulting product is a polytetramethylene ether polyurethane-urea having the formula:

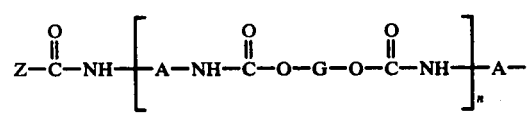

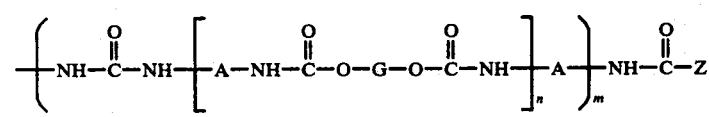

where Z is a chain terminating group; A is a bivalent organic radical having the structure:

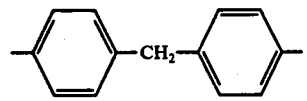

G is a bivalent organic radical having the structure:

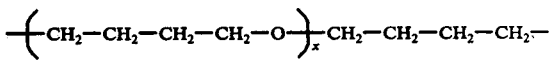

wherein $x$ is an integer such that the average molecular weight of the radical G is between about 650 and 2,000; and $n$ and $m$ are integers greater than 0.

The new thermoplastic polytetramethylene ether polyurethane-urea resins of this invention and their preparation are illustrated by the following examples.

EXAMPLE I

A stainless-steel reaction vessel of suitable size is charged with 1,290 parts (2.04 mols) of polytetramethylene ether glycol (POLYMEG 650 manufactured by the Quaker Oats Co., 30 E. 42nd St., New York, N.Y., having a molecular weight of 630). The polytetramethylene ether glycol is heated to 40° C. with stirring. Seven hundred parts (2.8 mols) of 4,4'-diphenyl methane diisocyanate is added to the polyglycol with stirring over a period of 1 to 2 minutes. The molar ratio of 4,4'-diphenyl methane diisocyanate to polytetramethylene ether glycol is about 1.37:1. The reaction is exothermic and the temperature is permitted to increase to 85° C. After addition of the 4,4'-diphenyl methane diisocyanate, the reaction mixture is maintained at 85° C. for 1½ hours with stirring to form a pre-polymer.

The number average molecular weight of pre-polymers prepared by the method described above has been determined by gel permeation chromatography to be about 3,200. The weight average molecular weight is about 7,500; and the ratio $\overline{M}_w/\overline{M}_n$ is 2.3.

A chain extender solution is prepared by dissolving exactly 22.8 parts (1.266 mol) of carbon dioxide-free water and 8.7 parts (0.067 mol) of dibutyl amine in 413.6 parts (440 parts by volume) of dimethyl acetamide. This extender solution is added with stirring to a solution of the pre-polymer dissolved in 940 parts (1,000 parts by volume) of dimethyl acetamide with stirring over a period of 3 minutes. Stirring is accomplished using a high torque agitator with a helical impeller. After the addition of the chain extender is complete, the stirring is continued for an additional 5 minutes (total time 8 minutes).

The polytetramethylene ether polyurethane-urea reaction product is precipitated from solution by pouring into a mixture of 1 part water and 1 part methanol with stirring. The precipitated polymer is pressed free of excess water and solvent, dried in a forced air oven at 80° C. and comminuted by grinding into 1/16-⅛ inch granules.

This product may be readily extruded at temperatures in the range of 180°-190° C. to form tubing. The product so obtained is useful in the manufacture of thin-walled medical tubing, catheters, cannuli, and films by reason of its high clarity, long flex life, bio-compatibility, and low tackiness. Such products may be conventionally sterilized by γ-irradiation, or ethylene oxide. The physical properties of this product are summarized in Table I which follows the examples.

EXAMPLE II

A stainless-steel reaction vessel of suitable size is charged with 2,000 parts (2.0 mols) of polytetramethylene ether glycol (POLYMEG 1,000 manufactured by the Quaker Oats Co., 30 E. 42nd St., New York, N.Y., having a molecular weight of 1,000). The polytetramethylene ether glycol is heated to 40° C. with stirring. Seven hundred parts (2.8 mols) of 4,4'-diphenyl methane diisocyanate is added to the polyglycol with stirring over a period of 1 to 2 minutes. The molar ratio of 4,4'-diphenyl methane diisocyanate to polytetramethylene ether glycol is about 1.4:1. The reaction is exothermic and the temperature is permitted to increase to 85° C. After addition of the 4,4'-diphenyl methane diisocyanate, the reaction mixture is maintained at 85° C. for 1½ hours with stirring to form a pre-polymer.

The number average molecular weight of pre-polymers prepared by the method described above has been determined by gel permeation chromatography to be about 9,200. The weight average molecular weight is about 18,800 and the ratio $\overline{M}_w/\overline{M}_n$ is 2.0.

A chain extender solution is prepared by dissolving exactly 22.8 parts (1.266 mols) of carbon dioxide-free water and 8.7 parts (0.067 mols) of dibutyl amine in 413.6 parts (440 parts by volume) of dimethyl acetamide. This extender solution is added with stirring to a solution of the pre-polymer dissolved in 940 parts (1,000 parts by volume) of dimethyl acetamide with stirring over a period of 3 minutes. Stirring is accomplished using a high torque agitator with a helical impeller. After the addition of the chain extender is complete, the stirring is continued for an additional 5 minutes (total time 8 minutes).

The polytetramethylene ether polyurethane-urea reaction product is precipitated from solution by pouring into a mixture of 1 part water and 1 part methanol with stirring. The precipitated polymer is pressed free of excess water and solvent, dried in a forced air oven at 80° C. and comminuted by grinding into 1/16-⅛ inch granules.

This product may be readily extruded at temperatures in the range of 175°-190° C. The product so obtained is useful in extrusion cross-head coating of wire and may be used to manufacture external cardiac pacemaker leads. The physical properties of this product are summarized in Table I which follows the examples.

EXAMPLE III

A stainless-steel reaction vessel of suitable size is charged with 1,770 parts (0.894 mols) of polytetramethylene ether glycol (POLYMEG 2,000 manufactured by the Quaker Oats Co., 30 E. 42nd St., New York, N.Y., having a molecular weight of 1,980). The polytetramethylene ether glycol is heated to 40° C. with stirring. Three hundred and fifty-six parts (1.424 mols) of 4,4'-diphenyl methane diisocyanate is added to the polyglycol with stirring over a period of 1 to 2 minutes. The molar ratio of 4,4'-diphenyl methane diisocyanate to polytetramethylene ether glycol is about 1.6:1. The reaction is exothermic and the temperature is permitted to increase to 85° C. After addition of the 4,4'-diphenyl methane diisocyanate, the reaction mixture is maintained at 85° C. for 1½ hours with stirring to form a pre-polymer.

The number average molecular weight of pre-polymers prepared by the method described above has been determined by gel permeation chromatography to be about 7,300. The weight average molecular weight is about 14,600 and the ratio $\overline{M}_w/\overline{M}_n$ is 2.0.

A chain extender solution is prepared by dissolving exactly 22.8 parts (1.266 mol) of carbon dioxide-free water and 8.7 parts (0.067 mol) of dibutyl amine in 413.6 parts (440 parts by volume) of dimethyl acetamide. This extender solution is added with stirring to a solution of the pre-polymer dissolved in 940 parts (1,000 parts by volume) of dimethyl acetamide over a period of 3 minutes. Stirring is accomplished using a high torque agitator with a helical impeller. After the addition of the chain extender is complete, the stirring is continued for an additional 5 minutes (total time 8 minutes).

The polytetramethylene ether polyurethane-urea reaction product is precipitated from solution by pouring into a mixture of 1 part water and 1 part methanol with stirring. The precipitated polymer is pressed free of excess water and solvent, dried in a forced air oven at 80° C. and comminuted by grinding into 1/16-⅛ inch granules.

This product may be injection molded at temperatures in the range of 195°-200° C. to form the Y-connector end of a Foley urethral catheter. The physical properties of this product are summarized in Table I which follows the examples.

EXAMPLE IV

A stainless-steel reaction vessel of suitable size is charged with 2,580 parts (4.08 mols) of polytetramethylene ether glycol (POLYMEG 650 manufactured by the Quaker Oats Co., 30 E. 42nd St., New York, N.Y., having a molecular weight of 630). The polytetramethylene ether glycol is heated to 40° C. with stirring. Fourteen hundred parts (5.6 mols) of 4,4'-diphenyl methane diisocyanate is added to the polyglycol with stirring over a period of 1 to 2 minutes. The molar ratio of 4,4'-diphenyl methane diisocyanate to polytetramethylene ether glycol is about 1.41:1. The reaction is exothermic and the temperature is permitted to increase to 85° C. After addition of the 4,4'-diphenyl methane diisocyanate, the reaction mixture is maintained at 85° C. for 1½ ours with stirring to form a pre-polymer.

The number average molecular weight of pre-polymers prepared by the method described above has been determined by gel permeation chromatography to be about 3,200. The weight average molecular weight is about 8,500; and the ratio $\overline{M}_w/\overline{M}_n$ is 2.3.

A chain extender solution is prepared by dissolving exactly 45.3 parts (2.516 mol) of carbon dioxide-free water and 3.6 parts (0.0277 mol) of dibutyl amine in 827.2 parts (880 parts by volume) of dimethyl acetamide. This extender solution is added with stirring to a solution of the pre-polymer dissolved in 1,880 parts (2,000 parts by volume) of dimethyl acetamide with stirring over a period of 3 minutes. Stirring is accomplished using a high torque agitator with a helical impeller. After the addition of the chain extender is complete, the stirring is continued for an additional 15 minutes (total time 18 minutes). The stirrer is then removed and the polymer solution is aged at room temperature for 1 hour. The polyether polyurethane polyurea reaction product is precipitated from solution by pouring into a mixture of 1 part water and 2 parts methanol with stirring. The precipitated polymer is pressed free of excess water and solvent, dried in a forced air oven at 80° C. and comminuted by grinding into 1/16-⅛ inch granules.

The polyether polyurethane polyurea may be readily extruded at temperatures in the range of 180°–190° C. to form tubing that may be autoclaved at temperatures of 121° C. (15 psig) for 30 minutes or flash-autoclaved at 132° C. (27 psig) for 5 minutes. The product so obtained is useful in the manufacture of thin-walled medical tubing by reason of its high clarity, long flex life, bio-compatibility, and low tackiness. The physical properties of this product are summarized in Table I which follows:

TABLE I

| PROPERTIES OF EXAMPLES | I | II | III | IV |
| --- | --- | --- | --- | --- |
| Tensile Strength (psi) | 1579 | 2443 | 3384 | 2249 |
| Ultimate Elongation (%) | 413 | 539 | 681 | 361 |
| Young's Modulus (psi) | 1253 | 1008 | 721 | 1666 |
| Softening Point (° C. by TMA*) | 128° | 127° | 149° | 144° |
| Glass Transition Temperature (° C. by TMA*) | −22° | −6° | −2° | −26° |
| Shore Hardness - Scale A | 87 | 80 | 73 | 70 |
| Intrinsic Viscosity[1] | 1.94 | 1.97 | 1.37 | 2.09 |
| Molecular Weight Data | | | | |
| $\overline{M}_n$ | 51,500 | 71,000 | 103,000 | 45,010 |
| $\overline{M}_w$ | 415,000 | 396,000 | 406,000 | 929,100 |
| $\overline{M}_z$ | 2,420,000 | 1,300,000 | 1,000,000 | 2,487,000 |
| $\overline{M}_w/\overline{M}_n$ | 8.05 | 5.58 | 3.94 | 20.6 |

*Thermal Mechanical Analysis
[1]Determined in dimethyl acetamide at 25° C.

Optimum thermoforming temperatures are determined for the composition of Examples I, II, III, and IV by capillary rheometry. All four compositions are thermally stable at the indicated temperatures as defined by constant melt viscosity and absence of discoloration.

| EXAMPLE | TEMPERATURE (° C.) |
| --- | --- |
| I | 186 |
| II | 192 |
| III | 218 |
| IV | 195 |

Heat sealing and injection molding can be used to fabricate products from the compositions of Examples I, II, III, and IV. The four compositions are readily extruded using a 25:1 L/D, ¾ inch extruder with a 3:1 compression ratio screw under the following conditions:

| | Feed Temp. Zone 1 ° C | Compression Temp. Zone 2 ° C | Metering Temp. Zone 3 ° C | Die Temp. Zone 4 ° C |
| --- | --- | --- | --- | --- |
| Example I | | | | |
| Tubing | 180 | 185 | 190 | 125–190 |
| Film | 190 | 195 | 200 | 150–160 |
| Fiber | 150–170 | 160–175 | 170–180 | 125–180 |
| Example II | | | | |
| Tubing | 180 | 190 | 190–195 | 160–190 |
| Film | 190 | 180 | 175 | 170–175 |
| Fiber | 150–170 | 175 | 170–175 | 150–180 |
| Example III | | | | |
| Tubing | 195 | 200 | 180–200 | 160–195 |
| Film | 195 | 200 | 205 | 175–180 |
| Fiber | 160–175 | 165–180 | 170–185 | 175–190 |
| Example IV | | | | |
| Tubing | 200 | 195 | 195 | 185 |

The bio-compatibility of the polytetramethylene ether polyurethane-urea resins described above may be demonstrated by culturing mouse fibroblasts and human bladder cells in direct contact with extruded and solvent cast polymer film. Excellent growth and proliferation of both cell types is observed on the surfaces of the polymer film.

The suitability of the thermoplastic resins described in Examples I–IV for use as a container or accessory thereto, of a parenteral preparation is determined by the test method described at Page 926 of the *United States Pharmacopoeia, Vol. XVIII*. No toxic effects are observed.

The thermoplastic polytetramethylene ether polyurethane-urea resins prepared according to this invention have many varied uses. They may be employed in the manufacture of bio-compatible surgical prostheses in the form of tubing (vascular and esophageal prosthesis), filaments (sutures and ligatures), films, and other shaped articles. The low softening point of the polytetramethylene ether polyurethane-urea permits the fabrication of surgical aids by extrusion, injection molding and heat sealing. Such medical products may be sterilized by γ-radiation, ethylene oxide gas and other conventional methods. The resins may be pigmented if desired with non-toxic coloring agents to give well-defined color.

It will be apparent that many different embodiments of this invention may be made without departing from the spirit and scope thereof, and therefore, it is not intended to be limited except as indicated in the appended claims.

What is claimed is:

1. A process for preparing melt-extrudable polytetramethylene ether polyurethane-urea resins which comprises:
   a. reacting a polytetramethylene ether glycol having a molecular weight of from about 650 to 2,000 with 4,4'-diphenyl methane diisocyanate to form a prepolymer having isocyanate termination and a number average molecular weight of from about 2,000 to 10,000,
   b. dissolving the prepolymer in an organic solvent,
   c. extending said prepolymer by reaction in said organic solvent with water to form a solution of polytetramethylene ether polyurethane-urea polymer having a molecular weight of from about 50,000 to 100,000 in said solvent,
d. precipitating said polytetramethylene ether polyurethane-urea polymer from said solvent in an aqueous monohydric alcohol solution, and
e. recovering said precipitated polymer from said aqueous solution.

2. A process of claim 1 wherein the molar ratio of diisocyanate to glycol in step (a) is between 1.3:1 and 1.7:1.

3. A process of claim 1 wherein the reaction of polytetramethylene ether glycol and 4,4'-diphenyl methane diisocyanate in step (a) is conducted at about 85° C.

4. A process of claim 1 wherein the organic solvent of step (b) is dimethyl acetamide.

5. A process of claim 1 wherein the water in the prepolymer extension step (c) includes an effective amount of a chain terminating agent.

6. A process of claim 5 wherein the chain terminating agent is a secondary amine.

7. A process of claim 6 wherein the molar ratio of secondary amine to water is from about 0.01:1 to 0.07:1.

8. A process of claim 6 wherein the secondary amine is dibutyl amine.

9. A process of claim 1 wherein the prepolymer is extended in step (c) by reaction with a chain extender solution comprising water and a secondary amine in an organic solvent, the molar ratio of secondary amine to water being from about 0.01:1 to 0.07:1 and the molar ratio of water in the chain extender solution to glycol in step (a) being from about 0.5:1 to 1.5:1.

10. A process of claim 1 wherein the aqueous monohydric alcohol solution of step (d) comprises approximately equal parts water and alcohol.

11. A process of claim 10 wherein the alcohol is methanol.

* * * * *